Figure 4:
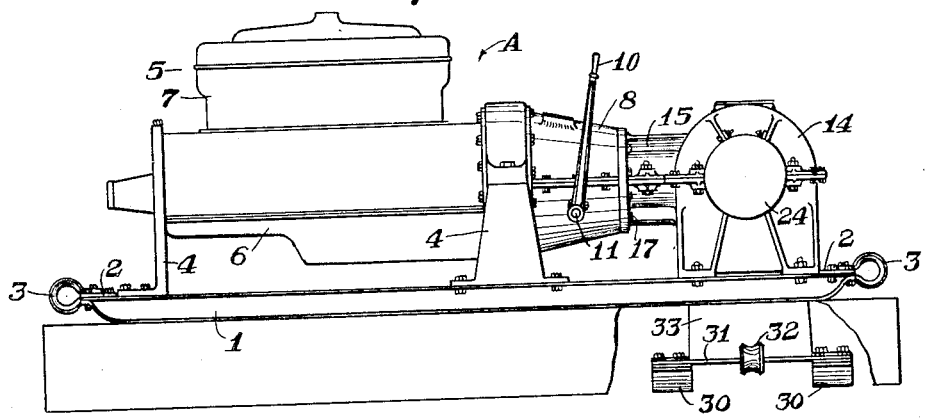

June 20, 1933. W. S. WESTBROOK 1,914,627
DRIVE FOR WELL DRILLING APPARATUS
Filed Sept. 16, 1930 2 Sheets-Sheet 1
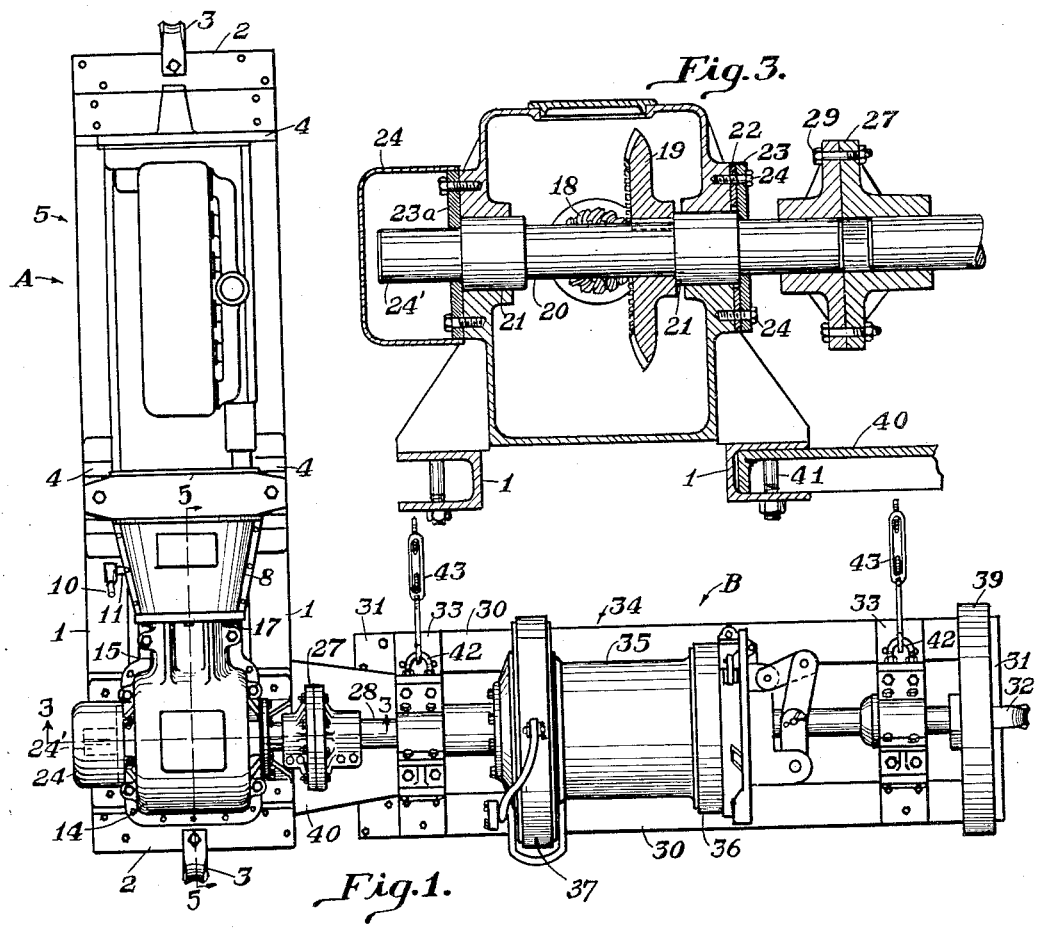
Inventor
W. S. Westbrook
By W. A. McDowell
Attorney Inventor
W. S. Westbrook
By H. A. McDowell
Attorney Patented June 20, 1933

1,914,627

UNITED STATES PATENT OFFICE

WALTER S. WESTBROOK, OF LOGAN, OHIO

DRIVE FOR WELL DRILLING APPARATUS

Application filed September 16, 1930. Serial No. 482,265.

This invention relates to a drilling engine drive mechanism for use in effecting the operation of well drilling tools and other apparatus. In equipment of this character it is important that while the apparatus shall be rugged, heavy and durable to withstand the severe service to which the same is placed, yet it is also desirable that such equipment shall be capable of being conveniently moved and sufficiently portable to admit of its ready transfer from place to place. Heretofore it has been customary to employ heavy duty gas or steam engines of the stationary type having horizontally arranged cylinders together with large fly or balance wheels and to bolt or otherwise stationarily secure these engines to a suitable concrete or other type of stationary base or foundation, whereby said engines may be employed for the purpose of effecting the operation of associated drive means for effecting the operation of a rotary pulley over which endless belts are trained and lead to the enlarged band wheels of the drilling apparatus, per se.

This customary mechanism, which is practically standard in well drilling apparatus, is objectionable particularly for the reason that its extremely heavy and difficult to handle, transport and to mount on the beds or foundations provided therefor. Again, such standard drilling engines require a considerable floor or base area and operate the belt driving pulley associated therewith at a comparatively slow rate of speed.

It is therefore an object of the present invention to provide a drilling engine of the multiple cylinder internal combustion type which is permanently carried by a portable base frame which permits the engine to be readily moved and transported from place to place in oil field operations by ordinary motor trucks or other similar vehicles.

Another object of the invention resides in mounting the rotary pulley on a second separable and portable base, whereby said pulley and its associated supporting and driving means may be likewise mounted and transported with the same facility and convenience as the engine unit.

It is another object of the invention to provide improved drive connections between the engine and clutch units of the pulley whereby the said units when in active operation will be relatively disposed with the longitudinal axis of each at substantially right angles to the longitudinal axis of the other.

A further object resides in the provision of a separable coupling for uniting the registering shaft ends of the engine and clutch units whereby the said units may be relatively operated to permit of their convenient and separate handling.

With these and other objects in view, which will appear as the description proceeds, the invention consists in the novel features of construction, combinations of elements and arrangements of parts hereinafter to be more fully described and pointed out in the appended claims.

Figure 5:
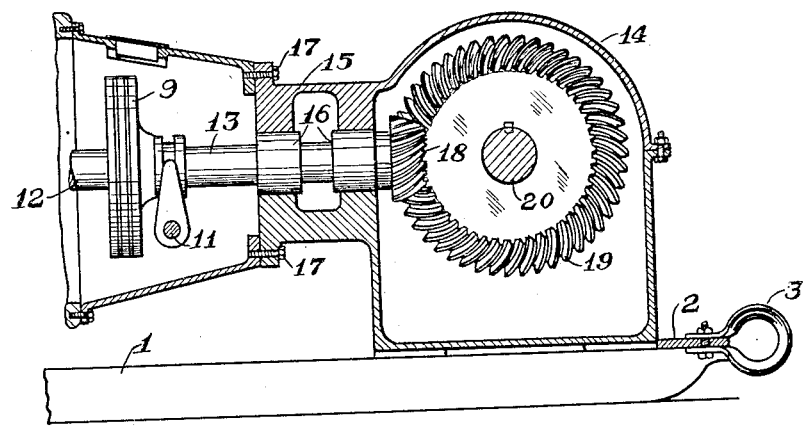
Figure 6:
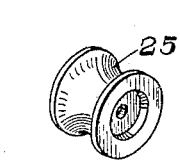
Figure 7:
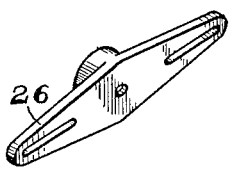

In the accompanying drawings:

Figure 1 is a top plan view of the drilling engine and drive mechanism comprising the present invention, the engine and clutch units being shown in driving or assembled relationship, Figure 2 is a front elevation of the structure disclosed in Figure 1, Figure 3 is a vertical longitudinal sectional view taken on the plane disclosed by the line 3—3 of Figure 1 and disclosing particularly the right angle drive of the engine unit and the separable coupling uniting the registering shaft portions of the engine and shaft units, Figure 4 is a side elevation of the engine unit and its associated drive means, Figure 5 is a vertical transverse sectional view taken on the line 5—5 of Figure 1, Figures 6 and 7 are detail views of drive attachments for the engine unit.

Referring more particularly to the drawings, the letter A designates the engine unit and B designates the clutch unit. These units are adapted to be separated when the mechanism is being transported, adjusted or otherwise handled to provide for convenience in shipping and placing, but when in active operation the said units are united and arranged as shown especially in Figures 1 and 2.

The engine unit A comprises a pair of longitudinally extending transversely spaced structural steel channel members 1—1 connected by means of suitable transverse plates 2 to constitute a rigid frame or base. The ends of said frame or base have bolted thereto suitable eye members 3 in which hooks, cables or other suitable pulling and adjusting devices may be inserted to facilitate the movement of the base unit when being handled or transported. Carried by the channel members are upstanding brackets 4 which comprise a mounting for the reception and support of a multiple cylinder internal combustion engine 5. The engine 5 includes a crank case 6 and a vertical cylinder block 7. To the rear of the crank case there is secured the usual clutch housing 8 in which is arranged any suitable standard type of clutch 9 which is adapted to be controlled by a manually operated lever 10 connected with a rock shaft 11 and arranged exteriorly of the housing 8. The crank shaft of the engine 5 is indicated by the numeral 12 and is connected as usual with the driving member of the clutch 9, while a driven shaft 13 extends longitudinally from the driven member of the clutch 9. By operating the lever 10 the rotation of the driven shaft is under the ready control of an operator.

Stationarily mounted on the channel members 1—1 at one end of unit A is a casing 14 which includes a bearing section 15 formed to accommodate spaced roller and thrust bearings 16. The bearings 16 are formed for the rotatable reception of the driven shaft 13. Screws or bolts 17 are utilized to secure the adjoining portions of the housing 8 and the casing 14 together, as shown in Figure 5. The outer end of the shaft 13 is provided with a pinion 18 formed with bevelled spiral helical teeth, and the teeth of the pinion 18 mesh with the similarly formed teeth of a helical gear 19. The gear 19, as shown in Figure 3, is fixed upon a shaft 20 which is journaled in spaced roller bearings 21 carried by the casing 14, the shaft 20 being arranged at right angles to the driven shaft 13. One side of the casing 14, adjacent to one of the bearings 21, is provided with a gasket 22 engaged by a disk 23 which is bolted as at 24 in engagement with the outer wall of the casing 14. By varying the thickness of the gasket 22 the driving relationship between the teeth of the pinion 18 and the gear 19 may be readily controlled, since the disk 23 engages with the end of one of the bearings 21 and is therefore capable of moving the bearing and the gear 19 longitudinally of the shaft 20. The other of the bearings 21 is engaged by a corresponding disk 23a and a gasket may or may not be employed between the disk 23a and the adjacent side wall of the casing 14. The shaft 20 projects beyond the disk 23a and is normally covered by means of a readily removable cap 24. This projecting end of the shaft 20 may be used to effect the operation of driving attachments such as are shown in Figures 6 and 7. In Figure 6 there is illustrated an attachment known as a "cat-head", indicated at 25, which can be used for taking down stems or pulling heavy tools from derricks. In Figure 7 there has been illustrated what is known as a "reel-arm", indicated at 26, often used for effecting the operation of torpedo or measuring lines. When the attachments shown in Figures 6 and 7 are not used, the cap 24 is applied to protect the protruding end of the shaft 20 as shown at 24'.

One end of the shaft 20 extends a considerable distance beyond the disk 23 and this end of the shaft has fixed thereto one of the sections of a coupling 27, the other section of the coupling being mounted on a longitudinally registering clutch operating shaft 28, the two sections of the coupling being secured together as usual, by means of transversely extending bolts 29 of a removable character. When the halves of the coupling are disconnected the engine and clutch units may be separated.

The clutch unit B also comprises a base or frame consisting of spaced channel members 30—30 united by means of transversely extending horizontally disposed plates 31 to form a rigid frame structure, the ends of the channel members 30 being equipped with eye members 32 corresponding in function and purpose to the eye members 3.

Arising from opposite ends of the base frame of the clutch unit are bearing brackets 33 which rotatably receive the clutch shaft 28 and support the latter for rotation in unison with the shaft 20 of the engine unit. Mounted on the clutch shaft 28 between the brackets 33 is a standard drive mechanism 34 which may be of any approved type commonly found in connection with well drilling machinery for driving a belt wheel and which, in turn, imparts motion to an enlarged band wheel used in controlling the effective length of drill or hoist cables. The drive mechanism consists of a pulley and clutch member of which the former is designated by the numeral 35 and around which the band wheel belt (not shown) passes. At one end of the pulley 35 is provided the customary friction brake 36 adapted for use in regulating the speed of rotation of the pulley 35, while at the other end of the pulley there is provided a friction band brake 37 which governs the rotation of the driving portion of the clutch, or in other words the shaft 28. Both of the brakes 36 and 37 are provided with the usual manual controls 38 for governing their operation. The clutch shaft 28 may be provided at one end with a fly or balance wheel 39 which may or may not be employed.

In addition to the coupling 27 the engine and clutch units A and B may be united by a removable connecting web 40 which extends from one of the bearing brackets 33 into one of the channel members 1. Removable bolts 41 unite the forward end of the web 40 with the channel member 1. However, by the mere removal of the bolts 41 and the bolts found in the coupling 27 the units A and B may be separated. The brackets 33 may also be provided with eye members 42 to which may be detachably secured adjustable tie rods 43 which are used for the purpose of relieving strain on the clutch unit incident to the operation of an endless belt passing around the pulley 35 and likewise to relieve the coupling 27 of strains or stresses tending to bring the shafts of the coupling out of alignment.

In view of the foregoing it will be seen that the present invention provides engine driven clutches for well drilling apparatus which has the advantage of being extremely durable and substantial in construction yet capable of being readily taken apart to permit of the convenient handling of the engine and clutch units. The engine and the clutch are stationarily mounted on the respective base frames of said units so that the drive as a whole is not disturbed during the transportation of the machinery, it being merely necessary to disconnect the coupling 27 and the web 40 from the engine frame which can be done readily in a few minutes. Due to the sled-like runners provided in conjunction with the units A and B the latter may be then drawn over the ground and positioned on the beds of motor trucks for distant transportation or may be pulled from place to place by draft animals or tractors.

One of the outstanding features of the present invention resides in the use of the multiple cylinder internal combustion engine on the unit A. Such an engine is in distinct contrast with the stationary types of gas and steam engines having horizontal cylinders heretofore almost universally used in apparatus of this character. By providing the multiple cylinder engine of the verticle cylinder type as disclosed, I am enabled to lighten the weight of this apparatus and, even more important, I provide a drive mechanism which may be driven at high rates of speed so that time and money are saved in the drilling of wells thereby in comparison with the previous types of drives. Again, the apparatus is extremely compact and requires but little floor space. This is secured in a large measure by the right angle drive which I have provided between the engine and clutch units. In Figures 1 and 2 the channels 1—1 of the engine unit have been shown as being mounted upon wooden sills or beams 44 to which the said channel members are preferably fastened when the unit is in operation. Before transportation, however, the channels 1 are disconnected from the sills 44. I thus provide units of strong, compact and light weight design. The entire apparatus can be moved in only two minutes, both units being stationarily mounted on their respective frames during transportation and likewise all adjustments thereof are left intact. When moved to a well location the apparatus can be readily set up in a few hours' time by ordinary laborers and will be ready for operation. There is no pull whatever on the drive connections between the units A and B since all belt strain is applied to the clutch pulley and the tie rods 43 associated with the bearing brackets 33. For very deep drilling or in handling heavy strains of pipe or casing, the fly wheel 39 is mounted on the clutch shaft, but the same may be removed when not needed. In making adjustments on the clutch unit or in regulating the operation of the drive mechanism between the units it is not necessary to stop the operation of the motor 5, since the clutch 9 may be thrown out, thus regulating the complete drive.

What is claimed is:

1. In well drilling apparatus, a driving and a driven unit, a base for each of said units, means for coupling said units for operation with one another in an L-shaped fashion, each of said bases being of a sled-like construction and provided with attaching means at either end thereof for effecting its transportation over the ground surface, and means for detachably connecting said bases with one another.

2. In well drilling apparatus, a driving and a driven unit, a base for each of said units, means for coupling said units for operation with one another at right angles, each of said bases being of a sled-like construction and provided with attaching means at either end thereof for effecting its transportation over the ground surface, and means for detachably connecting said bases with one another, said latter means when connected serving to automatically align the meeting ends of said coupling.

In testimony whereof I affix my signature.

WALTER S. WESTBROOK.